Figure 1:
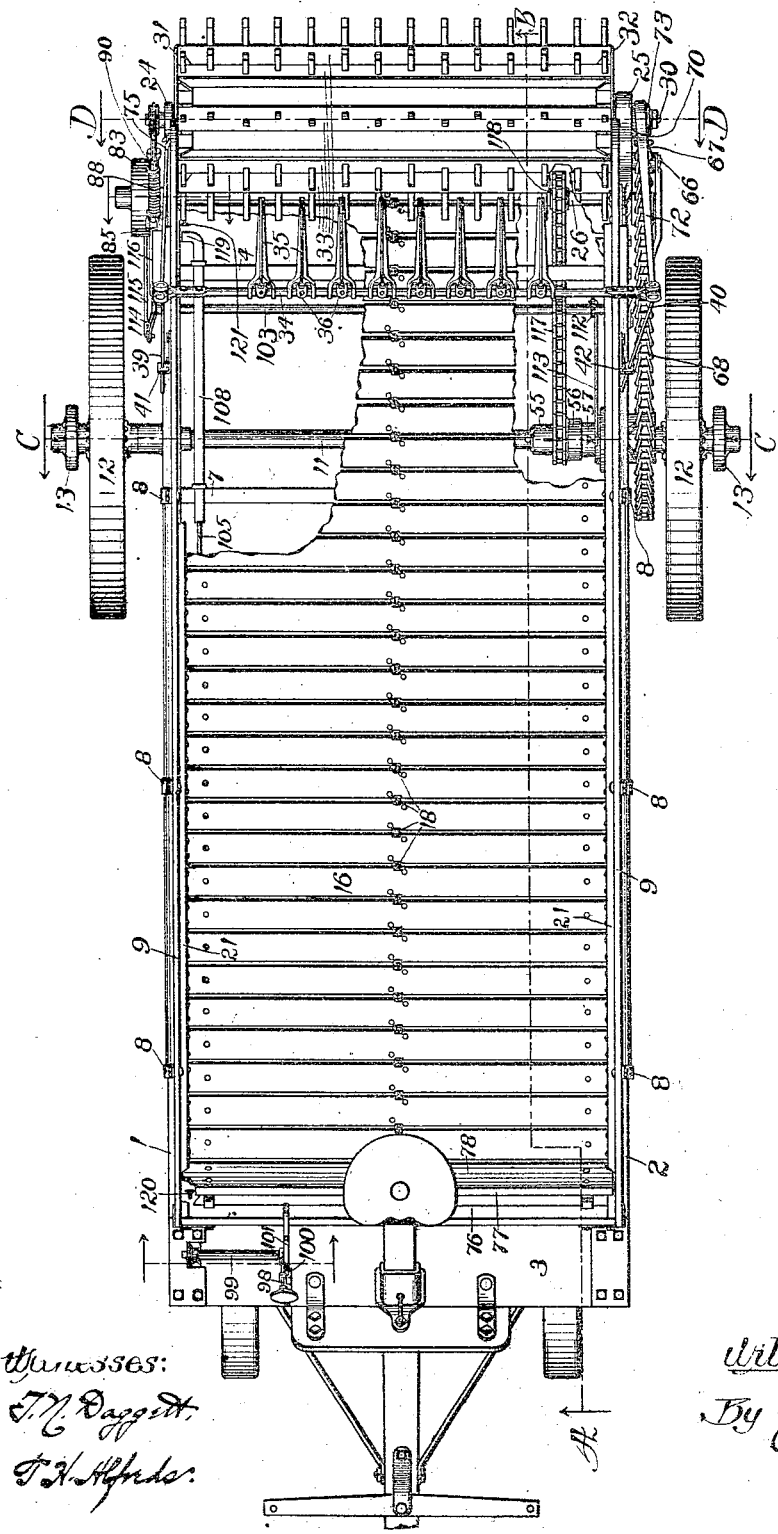

No. 873,823. PATENTED DEC. 17, 1907.
W. ZACHOW.
FERTILIZER DISTRIBUTER.
APPLICATION FILED MAY 1, 1905.

12 SHEETS—SHEET 1.

Witnesses:
T. N. Daggett.
T. H. Alfred.

Inventor:
William Zachow.
By E. W. Burgess
Attorney.

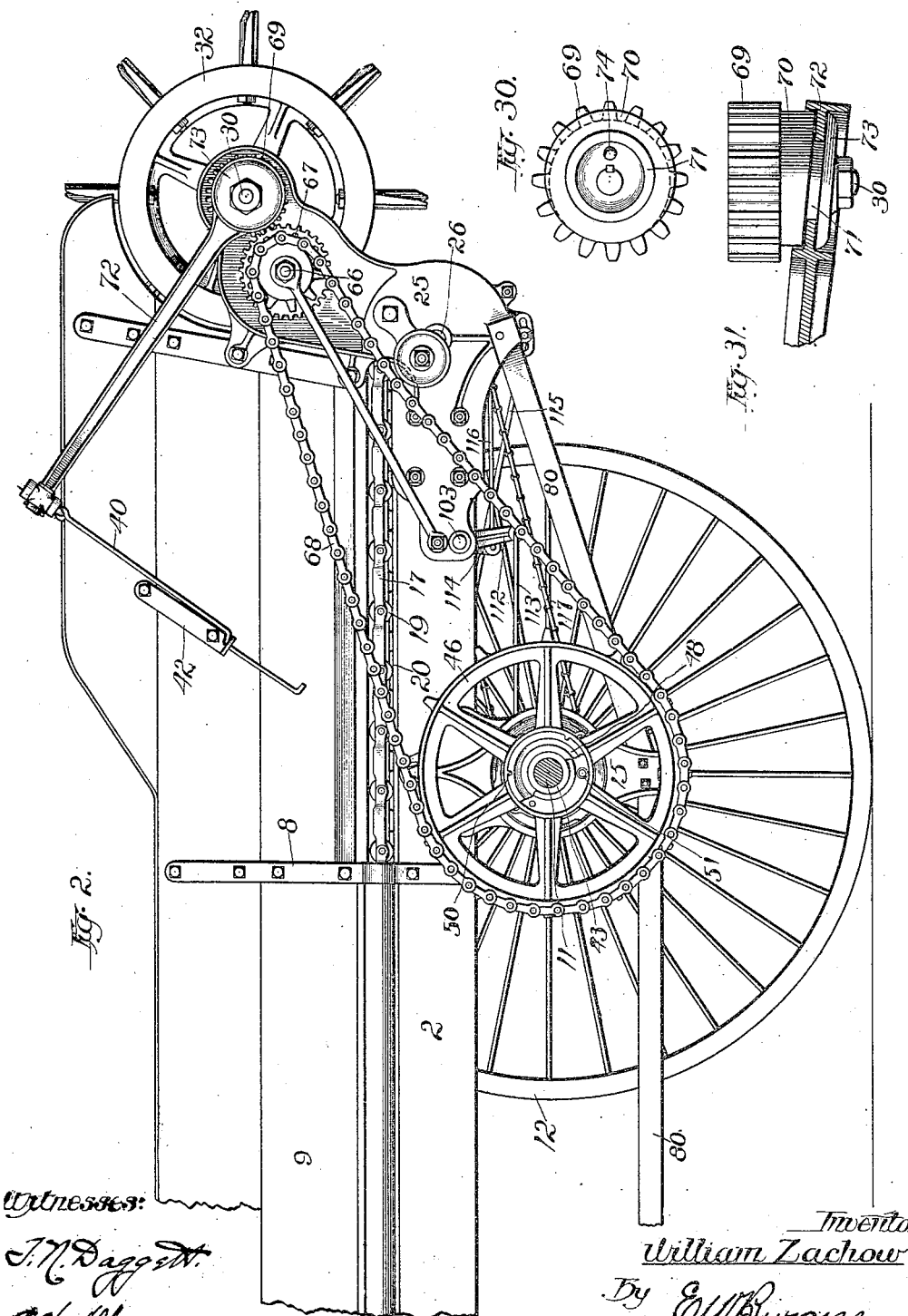

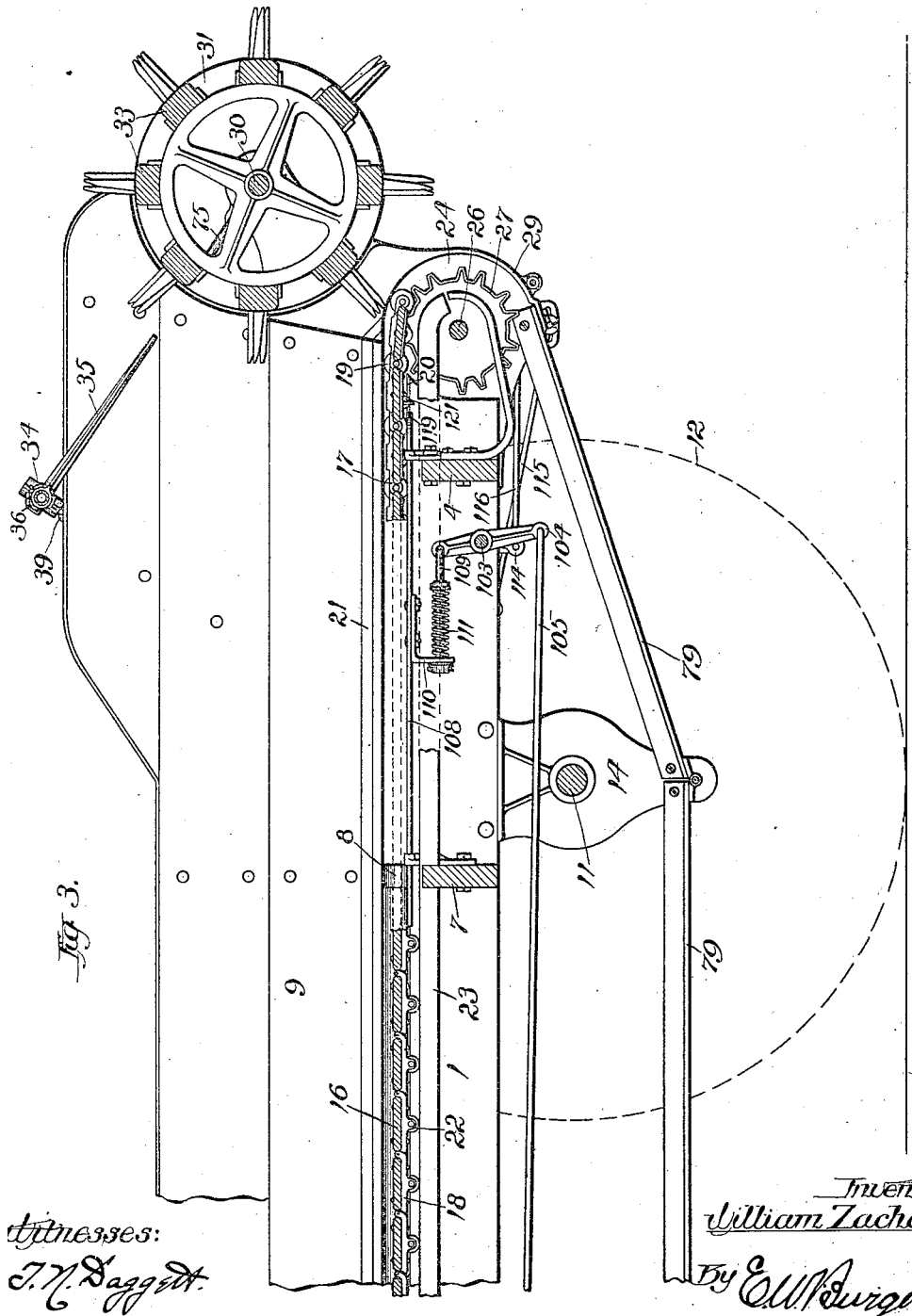

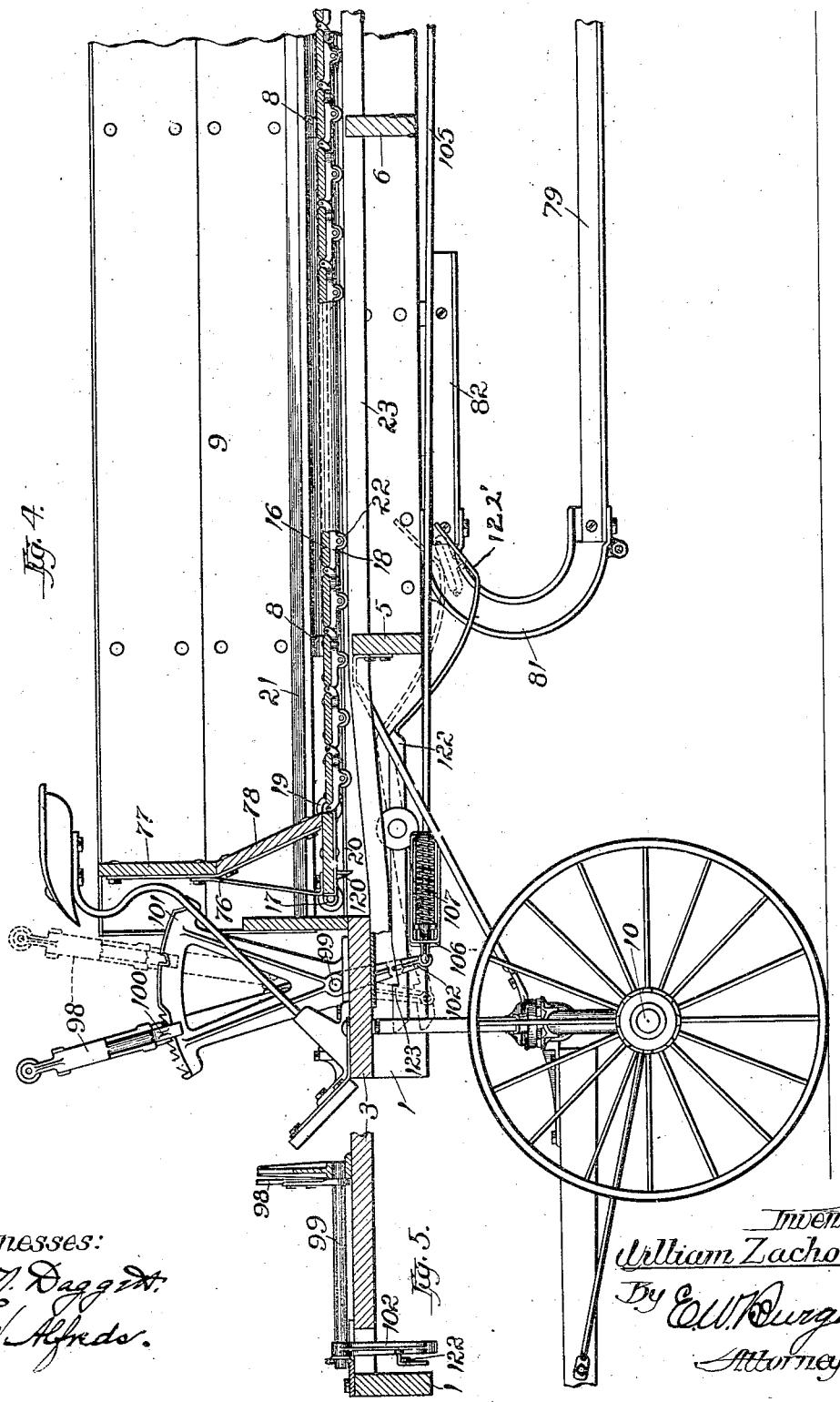

No. 873,823. PATENTED DEC. 17, 1907.
W. ZACHOW.
FERTILIZER DISTRIBUTER.
APPLICATION FILED MAY 1, 1905.
12 SHEETS—SHEET 5.
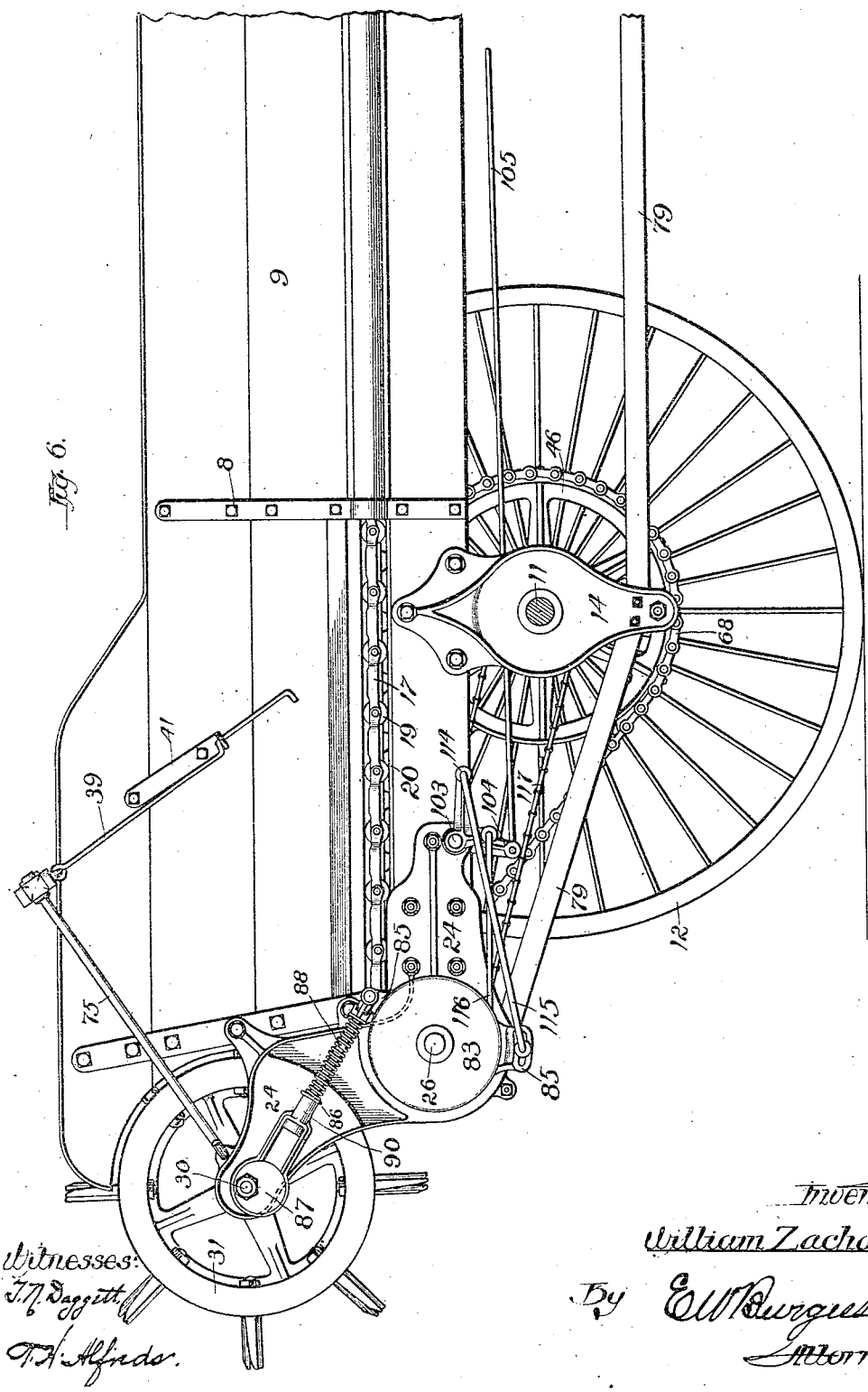
Witnesses:
T. N. Daggett
T. H. Alfred
Inventor
William Zachow
By E. W. Burgess
Attorney.

No. 873,823. PATENTED DEC. 17, 1907.
W. ZACHOW.
FERTILIZER DISTRIBUTER.
APPLICATION FILED MAY 1, 1905.
12 SHEETS—SHEET 6.
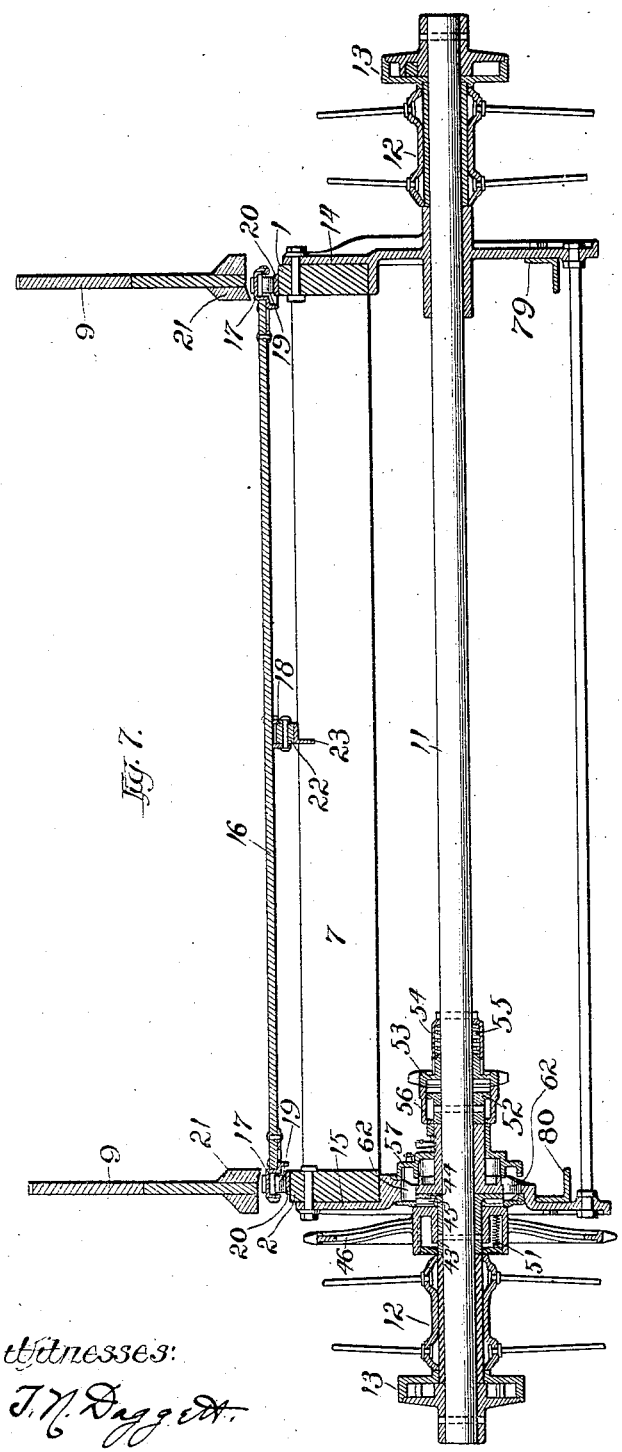
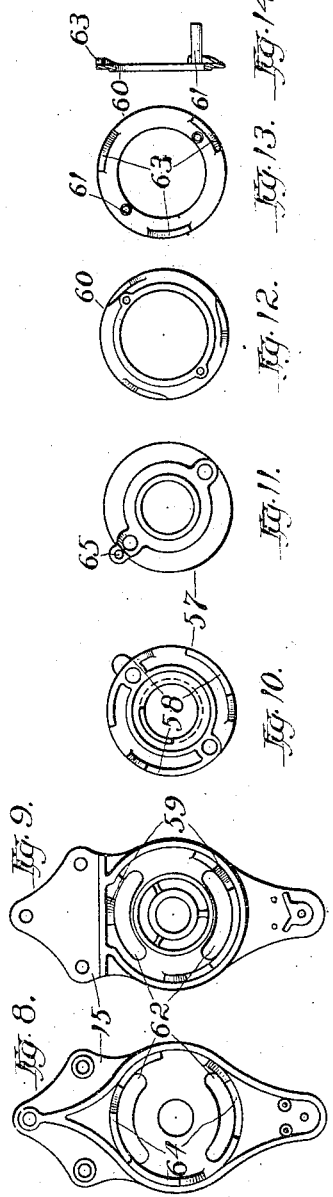
Witnesses:
J. N. Daggett.
T. H. Alfredo.
Inventor:
William Zachow
By E. W. Burgess
Attorney No. 873,823. PATENTED DEC. 17, 1907.
W. ZACHOW.
FERTILIZER DISTRIBUTER.
APPLICATION FILED MAY 1, 1905.
12 SHEETS—SHEET 7.
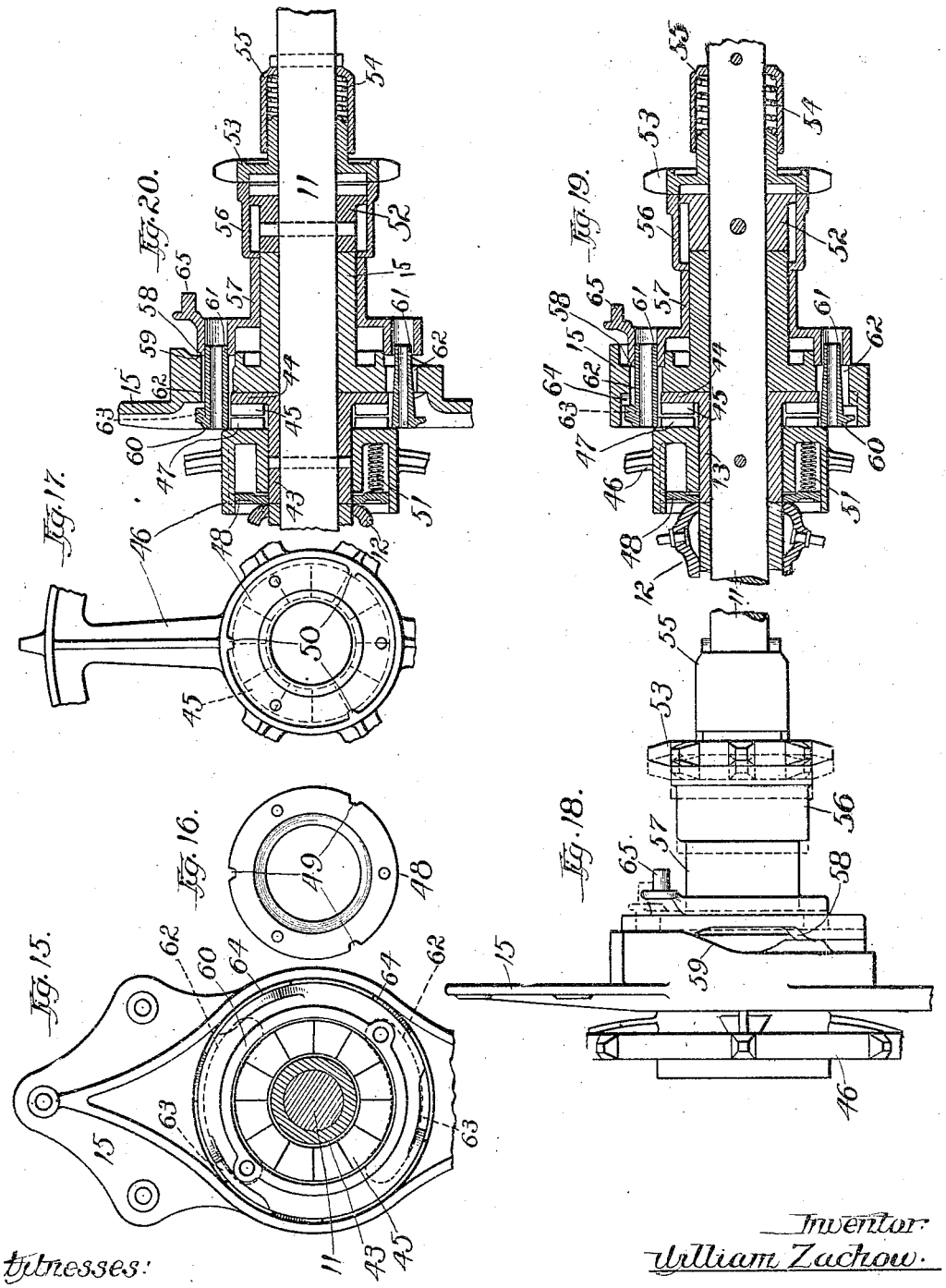
Witnesses:
T. M. Daggett
T. H. Alfeds
Inventor:
William Zachow
By E. W. Burgess
Attorney

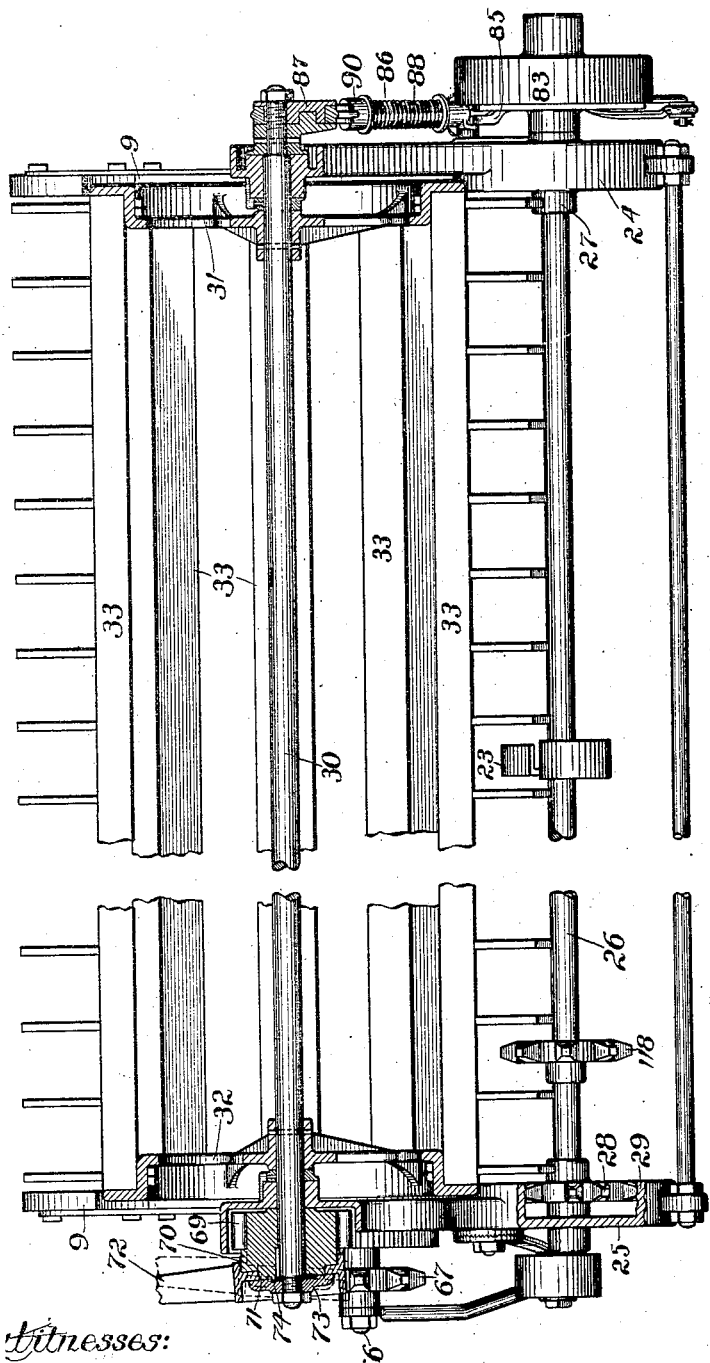

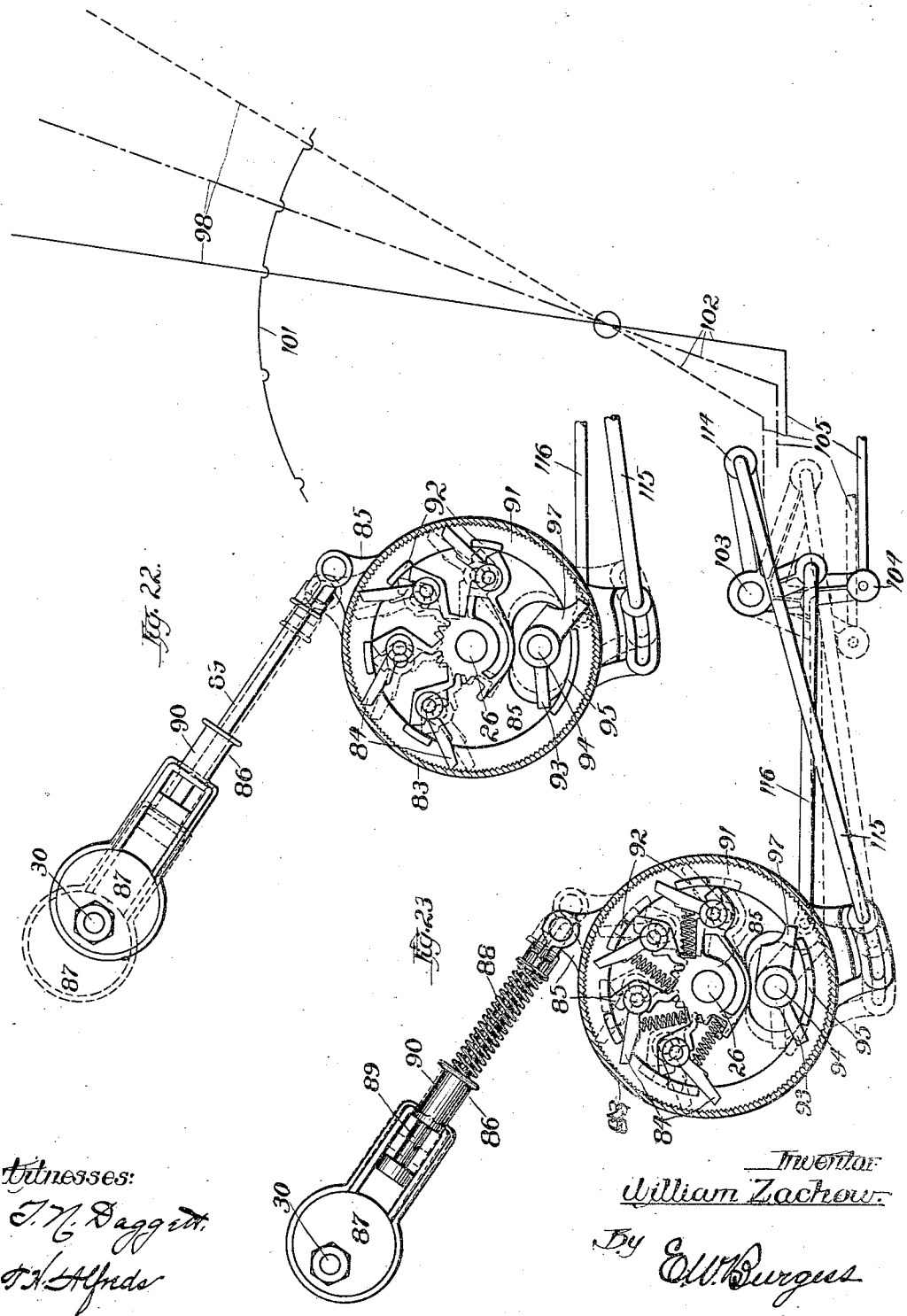

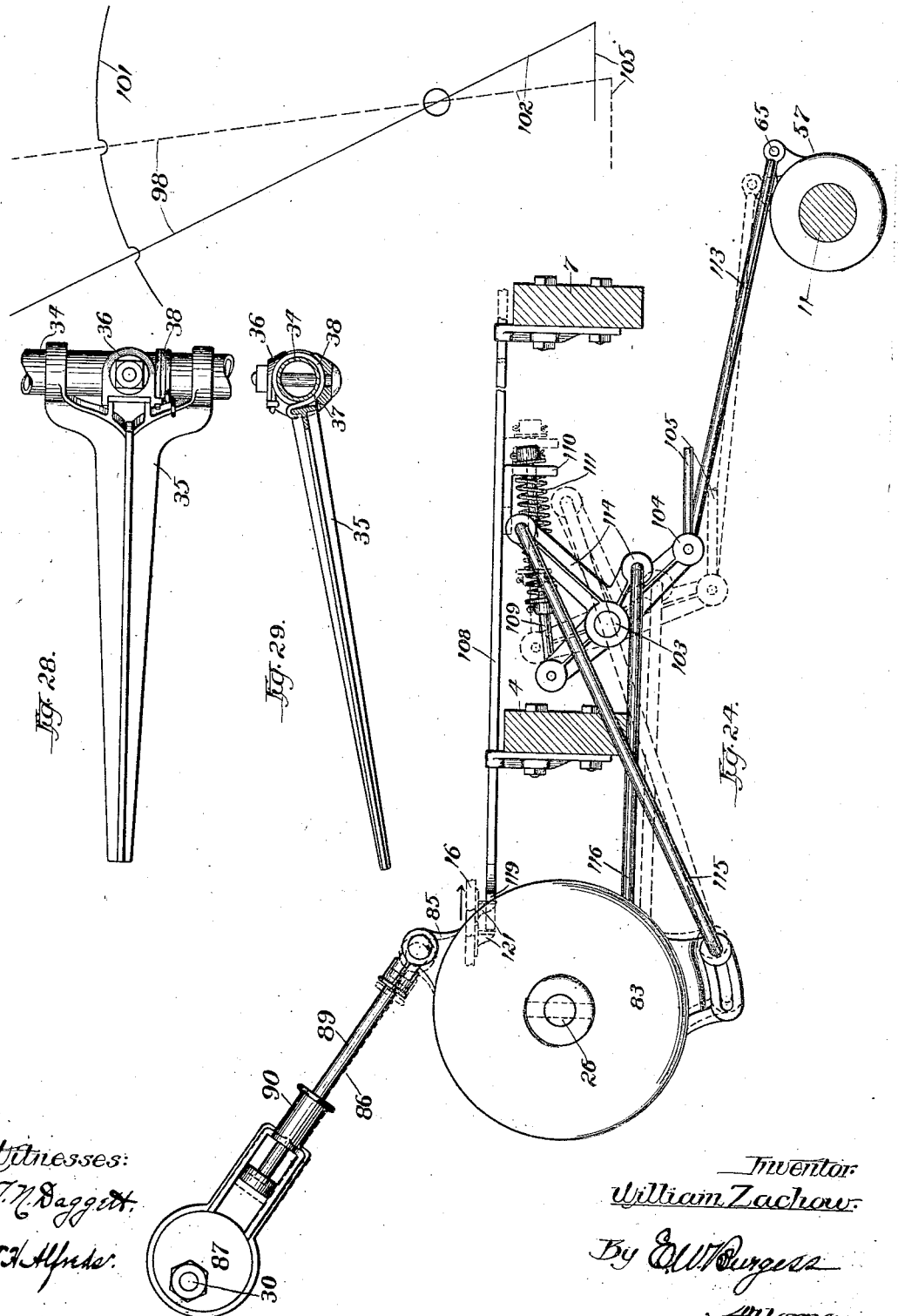

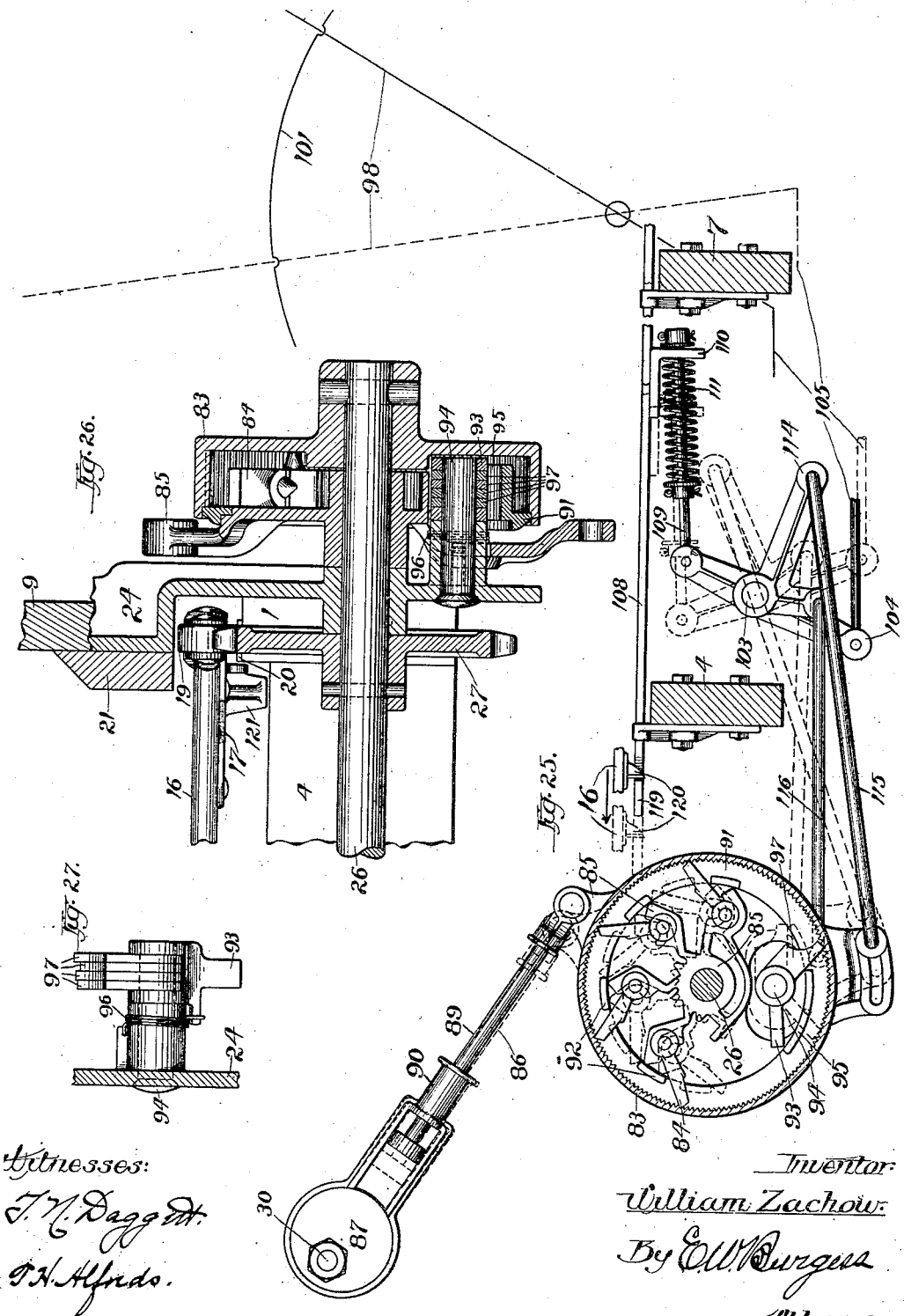

No. 873,823. PATENTED DEC. 17, 1907.
W. ZACHOW.
FERTILIZER DISTRIBUTER.
APPLICATION FILED MAY 1, 1905.
12 SHEETS—SHEET 12.
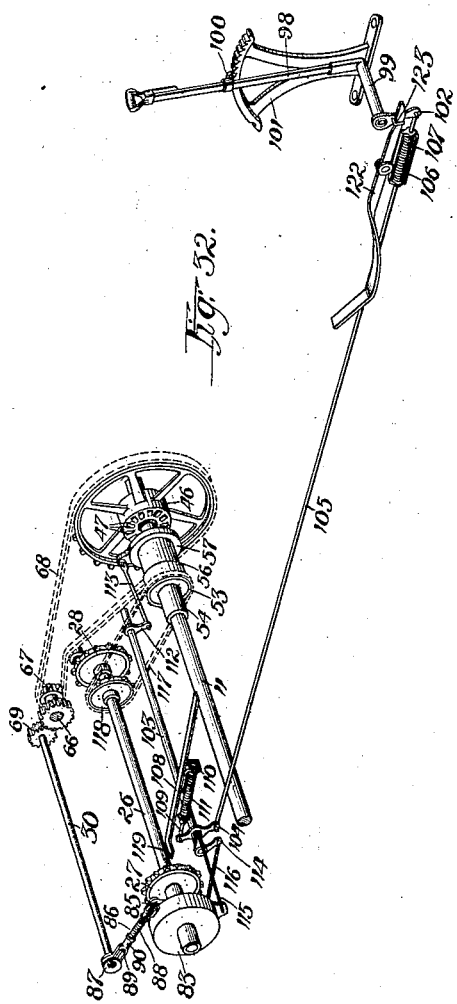
Witnesses:
J. N. Daggett.
I. H. Alfnds.
Inventor.
William Zachow.
By E. W. Burgess
Attorney.

UNITED STATES PATENT OFFICE.

WILLIAM ZACHOW, OF MILWAUKEE, WISCONSIN, ASSIGNOR TO INTERNATIONAL HARVESTER COMPANY, A CORPORATION OF NEW JERSEY.

FERTILIZER-DISTRIBUTER.

No. 873,823.

Specification of Letters Patent.

Patented Dec. 17, 1907.

Application filed May 1, 1905. Serial No. 258,300.

*To all whom it may concern:*

Be it known that I, WILLIAM ZACHOW, a citizen of the United States, residing at Milwaukee, in the county of Milwaukee and State of Wisconsin, have invented certain new and useful Improvements in Fertilizer-Distributers, of which the following is a specification, reference being had to the accompanying drawing, forming a part thereof.
This invention relates to that class of fertilizer-distributers which embody a box or body mounted on a wheeled frame, a movable bottom or apron upon which the fertilizer is placed, and a rotary distributing cylinder, against which the fertilizer is slowly fed by the movement of the bottom and by which it is picked up and thrown or spread rearwardly from the machine.

The objects of this invention are to improve the construction of the movable bottom and the mechanism by which the feed movement is imparted to it; to provide a simple and convenient mechanism for returning the bottom to its initial position by power derived from the rear axle when the load has been distributed; to provide an improved clutch mechanism that is automatically operated to disconnect the motive power from the operative parts when the same have reached predetermined positions; to provide an improved form of comb to assist in disintegrating the fertilizer, and to provide means whereby the comb is given a vibrating movement longitudinally relative to the axis of the distributing cylinder; to provide an improved form of track for the movable bottom, and an improved construction of the box and distributing cylinder whereby the tendency of the fertilizer to clog at the ends of the cylinder is avoided.

In the accompanying drawings Figure 1 is a top plan view of the machine; Fig. 2 is a left-hand side elevation of the rear portion of Fig. 1; Figs. 3 and 4 represent a longitudinal section, as indicated by the line A—B on Fig. 1; Fig. 5 is a detail of part of the clutch adjusting mechanism; Fig. 6 is a right-hand side elevation of the rear portion of Fig. 1; Fig. 7 is a cross section on line C—C of Fig. 1; Fig. 8 is an outside view of the left-hand bracket in which the rear axle is journaled; Fig. 9 is an inside view of Fig. 8; Figs. 10, 11, 12, 13 and 14 are details of the clutch mechanism; Fig. 15 is a view similar to Fig. 8, with a part of the clutch mechanism connected therewith; Fig. 16 is a detail of part of clutch mechanism; Fig. 17 is a part of the main driving sprocket wheel; Fig. 18 is an elevation of part of the clutch mechanism;
and Figs. 19 and 20 are sections of Fig. 18 showing the clutch mechanism in different positions of adjustment; Fig. 21 is a cross section on line D—D of Fig. 1; Figs. 22, 23, 24, 25, 26 and 27 are details of the mechanism for moving the bottom; Fig. 28 is a plan view of one of the comb fingers, and Fig. 29 is a side elevation, partly in section, of Fig. 28; Figs. 30 and 31 are details of the mechanism for vibrating the comb, and Fig. 32 is a perspective view of the operative parts, the wheels, body, apron and distributing cylinder being removed.

The same reference numerals represent similar parts throughout the several views.

1 and 2 are the right and left-hand sills respectively of the body frame, 3 and 4 are front and rear cross sills, and 5, 6 and 7 represent intermediate cross-sills that are secured to the side sills.

Secured to the side sills are straps 8, that project upward and serve to support the sides 9 of the body. The body is mounted upon a front axle 10, and a rear axle 11, the latter being caused to rotate in a forward direction by the carrying wheels 12 and the usual backing ratchet mechanism 13 connected therewith. The rear axle is journaled in side castings or brackets 14 and 15 that are secured to the sills 1 and 2 respectively.

16 is a flexible bottom for the body, which consists of bars hinge jointed together by means of links 17 at their ends and other links 18 at their middle portion. The links 17 have rollers 19 that rest upon metal tracks 20 secured to the upper side of the side sills, and the sides of the body at their bottom edges are nearly in contact with them and operate to hold the bottom in proper alinement; and 21 are guard strips secured to the inner surface of the sides for the purpose of shielding the connecting links. The bars are supported at their middle portions by means of rollers 22 journaled in the links 18 and resting upon a metal track 23, supported by the cross sills. At the rear ends of the side sills 1 and 2 are secured castings 24 and 25, respectively, and journaled therein, is a shaft 26, to which is secured sprocket wheels 27 and 28, with which the links 17 of the movable bottom engage in a manner to be driven in either direction thereby. The castings 24 and 25 are provided with annular rims 29 that partially surround the sprocket wheels and serve as guides for the rollers 19 and prevent the links 17 from becoming disengaged from the sprocket wheels. The castings 24 and 25 extend rearward and upward, and journaled at their upper ends is the shaft 30 of the distributing cylinder. The cylinder is made in a common form, comprising heads 31 and 32 connected by beater bars 33 having the cylinder teeth attached thereto.

In operating machines of this class, as heretofore constructed, trouble has been met with by reason of the fertilizer being crowded between the cylinder head and the inner sides of the box; shields have been employed at the juncture of the heads and sides of the box to prevent clogging of the cylinder; but such means have not proved entirely effective, and to remove the evil I have made the cylinder longer, so that the outer surface of the head is beyond the inner surface of the body sides, as shown in Fig. 21.

In front of and above the distributing cylinder is mounted a comb bar 34 having comb teeth 35 independently and yieldingly mounted thereon; the bar is preferably tubular and the teeth have forked arms embracing it. Clips 36 are secured to the bar between the arms and have lip portions 37 that engage with central projections on the teeth in a manner to limit their downward movement, and a coiled spring 38 operates between the clip and tooth to yieldingly hold the latter in its downward position. The comb teeth have their points in close proximity with the teeth of the distributing cylinder and operate to hold back masses of the fertilizer and assist in a better distribution of the same. The comb bar is mounted at the upper ends of free swinging links 39 and 40 that are supported by straps 41 and 42, respectively, upon opposite sides of the body, the links being free to swing laterally and slide longitudinally a limited distance to allow the comb bar to rise under undue pressure and to normally float upon the moving load.

Motion is communicated to the various parts in the following manner: The rear axle 11 is caused to rotate in a forward direction by means of the carrying wheels, as before stated. Adjacent the hub of the wheel, at the left-hand side of the machine, between said hub and the side casting 15, there is secured to the axle a sleeve 43 having an annular flange 44 provided with clutch teeth 45 at its inner end. Journaled upon the sleeve is a main driving sprocket wheel 46, provided with clutch teeth 47 adapted to engage with the clutch teeth upon the annular flange of the sleeve in a manner to cause the sprocket wheel to revolve with the sleeve when so engaged. The sprocket wheel has a cylindrical portion outside its bearing upon the sleeve, and a disk 48 is loosely fitted to slide therein. The disk is provided with notches 49 in its periphery that engage with ribs 50 on the inner surface of the cylinder in a manner to cause the disk to rotate with the sprocket wheel. The sprocket wheel is adapted to move longitudinally along the sleeve sufficient to allow the two sets of clutch teeth to become disengaged, and coiled springs 51 operate between the disk and wheel to yieldingly hold the clutch parts in engagement. Secured to the axle, upon the opposite side of the journal bearing forming part of side casting 15, is a sleeve 52 provided with clutch teeth upon its inner end, and loosely journaled on the axle and adapted to slide longitudinally thereon, is a sprocket wheel 53 provided with clutch teeth adapted to engage with the clutch teeth on the sleeve, and 54 is a coiled spring surrounding the axle and operative between the sprocket wheel 53 and the collar or washer 55 that is held against longitudinal movement by a pin through the axle in the common way to normally hold the clutch in engagement. A cylindrical shell 56 surrounds the sleeve 52 having a bearing at one end thereon and at its opposite end on the journal bearing of part 15 and bearing against the rim of the sprocket wheel 53. A clutch shipping ring 57 is rotatably mounted on the journal bearing of the part 15 between the shell 56 and the web portion of said part 15. The shipping ring is adapted to move longitudinally upon the journal bearing, and 58 and 59 are opposing annular cam surfaces on the ring and part 15, respectively, that are adapted, when the ring is rotated in one direction, to move the ring longitudinally in a manner to press against the shell 56 and cause the sprocket wheel 53 to be disengaged from the clutch sleeve 52. A supplemental clutch shipping ring 60 is rotatably mounted on the opposite side of the side casting 15, having laterally projecting stems 61 passing through slots 62 in said casting that are concentric with the axle, said stems engaging with shipping ring 57 in a manner to be moved thereby and cause the ring 60 to be simultaneously rotated with the ring 57. The ring 60 bears against the inner surface of the sprocket wheel 46, and 63 and 64 are opposing annular cam surfaces on the ring 60 and part 15, respectively, that are adapted to separate the clutch teeth of the sprocket wheel from those of the sleeve 43 when the shipping ring is rotated in one direction. The cam surfaces on the respective parts are arranged in a manner to operate to hold the small sprocket wheel unclutched from its driving member during the time the large one is engaged with its driving member, and vice versa, or they will operate to hold both the sprocket wheels unclutched, according to the position of the rotatable clutch shipping rings and the slots 62 are made sufficiently long to allow for the necessary movement of the parts as they are adjusted to the various positions. The clutch shipping ring 57 is provided with a laterally projecting stem 65, to which the shipping connections are attached. Journaled upon a stud 66, secured to the side casting 25, is a combined sprocket wheel and spur gear 67, that is driven by a chain 68 from the main drive sprocket 46, and 69 is a spur pinion secured to the shaft of the distributing cylinder and meshing with the teeth on the spur gear part of the wheel 67 in a manner to be driven thereby. The spur pinion 69 is provided with a laterally projecting hub portion 70 that is eccentric with its axis and having its end surface at an angle with its axial line and provided with a boss 71 concentric with the hub and having its end surface parallel with that of the hub. An arm 72 is mounted upon the boss, and a washer 73, provided with a depression which engages the pintle 74 on the boss, is secured to the shaft outside the arm by means of the nut, as shown in Fig. 31. The angular surface of the hub operates in the revolution of the cylinder to vibrate the arm 72, which, at its outer end, is connected with the comb bar 34 and produces a vibrating movement of the bar longitudinally relative to the distributing cylinder. The comb bar swings with the arm 72 upon one side, and with the link 75 upon the opposite side of the machine. The vibrating movement imparted to the comb bar is an important feature of this invention and assists materially in disintegrating the mass of fertilizer as it is delivered to the distributing cylinder. The movable bottom has secured to its forward end a follower 76, comprising a substantially vertical upper portion 77, and a downward and rearward inclined portion 78, for the purpose of delivering the contents of the body to the distributing cylinder in a better manner than heretofore.

Connected with the side castings 24 and 25, and forming a continuation of the flanges 29, are angle bars 79 and 80, respectively, that extend downward and forward below the axle, where they are secured to the side castings 14 and 15 and perform the double function of braces for said castings and a track for the movable bottom. The bars extend forward of the axle substantially parallel with the horizontal plane of the side sills and are connected at their forward ends with upturned circular portions 81 connected with horizontal return portions 82 that operate to return a portion of the bottom toward the rear for the purpose of preventing it from coming in contact with the front wheels as they are turned under the body during a turning movement of the machine.

The flexible bottom is caused to move rearward by means of the internal ratchet wheel 83 secured to the end of the shaft 26 at the right-hand side of the machine, that is actuated by means of spring pressed pawls 84, pivotally mounted upon a pawl carrying lever 85 that is rotatably mounted upon the shaft 26 between the ratchet wheel and the part 24. The pawl carrying lever 85 is caused to vibrate about its bearing by means of the two-part telescoping pitman 86, connecting it with an eccentric 87 secured to the end of the distributing cylinder shaft. The throw of the eccentric is positive, and if it was connected with the pawl carrying lever by means of an unyielding pitman, it would actuate the lever and the ratchet wheel through the same distance at each stroke and thereby move the flexible bottom with the same relative speed at all times. It is desirable in this class of machines to provide means whereby the speed of the movable bottom may be regulated relative to the speed of the distributing cylinder, and to secure that result is one object of this invention. The pawl carrying lever is moved toward the distributing cylinder by a positive pulling action of the pitman, and is moved in the opposite direction by the yielding force of the coiled spring 88 surrounding the pitman and operative between opposing shoulders on the two parts of the pitman. When the pawl carrying lever is adjusted to the full limit away from the cylinder, the pitman operates with its full length to vibrate the arm; when the arm is adjusted toward the cylinder, the part 89 of the pitman will slide through the part 90 until stopped by the head formed upon the part 89 coming in contact with the part 90, and the measure of the effective pull thereof will be governed by the amount of free movement of one part relative to the other, that is, the lever will only be moved in a direction to turn the ratchet wheel when the pitman exerts a pulling force thereon, and as the pawl carrying lever is adjusted to or from the cylinder the distance through which that force operates will be determined and the speed of the flexible bottom in its rearward movement governed accordingly.

Mounted upon the pawl carrying arm, within the rim of the ratchet wheel, is a rotatable ring 91, having laterally projecting ear portions 92 that are adapted to contact with the pawls 84, when the ring is moved in one direction, in a manner to move the pawls out of operative engagement with the internal ratchet wheel. It is desirable in this class of machines to provide means for locking the flexible bottom against accidental movement rearward while the machine is being transported and prevent the load from crowding against the cylinder, particularly when ascending a hill. The locking means consist of a spring pressed pawl 93 rotatably mounted on a stud 94 secured to the part 24 and adapted to engage with the teeth of the internal ratchet wheel. A lateral projection 95, on the ring 91, operates to disengage the pawl from the teeth, and a coiled spring 96, surrounding the stud and operative between the part 24 and the pawl, returns it to its position of engagement when the ring is moved in one direction the spring connection between the pawl and the part 24 being shown in Fig. 27. When the machine is in operation and moving down an incline, there is a tendency for the bottom, with its load, to move forward during the time between the operative action of the pawl carrying arm and its return, and thus stop the effective feed. To prevent this there is mounted upon the stud that carries the spring pressed pawl 93 a number of gravity pawls 97 of different lengths adapted to engage with the teeth of the ratchet wheel and hold it in the direction of rotation caused by the operative pawl carrying arm. During the return movement of the bottom the gravity pawls are rendered inoperative by means of the projecting ear 95 on the ring 91 holding them out of engagement with the ratchet wheel.

The means provided for adjusting the operative mechanism comprises a hand lever 98 mounted on a rock shaft 99, suitably mounted on the front cross sill 3 of the machine and having the spring pressed detent 100 adapted to engage with the ratchet teeth on a sector rack 101. Secured to the rock shaft is a depending lever 102. A rock shaft 103 is rotatably mounted in the side sills in rear of the axle, and secured thereto, is a double armed lever 104 that has its lower end yieldingly connected with the lever 102 by means of the rod 105, yoke 106 and coiled spring 107, and its upper end yieldingly connected with a sliding bar 108 suitably mounted on the cross bars 4 and 7, by means of the link 109, bracket 110 and coiled spring 111.

Inside of sill 2, and substantially in line with the clutch shipping ring 57, there is secured to the rock shaft 103 a depending lever 112 that is connected with the ring by means of the link 113; and upon the rock shaft, outside the sill 1, is secured a bell crank lever 114 having one arm connected, by means of the link 115, with the pawl carrying arm 85, and the other arm with the pawl controlling ring by means of the link 116. The pawl carrying arm 85 has an elongated slot that receives the end of the link 115 for the purpose of permitting the operative action of the arm.

Referring to Figs. 22 and 23, the throw or vibration of the pawl carrying arm depends upon the position to which it is adjusted by the movement of the hand lever 98 and rock shaft 103, and as previously stated, the yielding pitman connection between the eccentric on the cylinder shaft and the pawl carrying arm permits such variable throw.

The several levers are so proportioned that when the hand lever 98 is moved to the position indicated by dotted lines in Fig. 4, the clutch mechanism is adjusted to the position shown in Fig. 20, with both of the sprockets disengaged from the driving members 43 and 52. And when the hand lever is moved rearward so that the detent will engage with the notch at the rear end of the sector rack, the clutch mechanism is in the position shown in Fig. 19, having the sprocket wheel 53 engaging with the clutch sleeve 52, and a sprocket chain 117 connects sprocket wheel 53 with sprocket wheel 118 secured to the shaft 26, and operates to return the movable bottom to its initial position to receive its load. To automatically arrest the movement of the bottom as it reaches the limit in either direction is the function of the sliding bar 108. At its rear end the bar has a laterally projecting portion 119 that is adapted to engage with a depending lug 120 secured to the front bar of the bottom and be moved thereby when the bottom has reached its rearward limit, and the bar through its link connections with the rock shaft 103 operates the clutch mechanism to arrest the movement of the operative parts. When the bottom is returned to its initial position to receive the load a depending lug 121, similar to lug 120, is secured to one of the rear bars of the bottom and contacts with the bar 108 in a like manner to arrest the movement of the operative parts. As shown in Fig. 25, the lug 120 is in contact with the lateral projection 119 on the sliding bar 108 and would operate to immediately rock the shaft 103 in its bearings and through its connections with the feeding mechanism, the rock shaft would operate to gradually reduce its speed. It is desirable that the speed of the movable bottom be unchanged until it has reached its rear limit, and to insure this the rock shaft is locked against movement at this time by means of the locking lever 122 pivotally mounted at the front of the machine, on a horizontal pivot and having the rearwardly upturned portion $122^1$ adapted to engage with the rear bar of the movable bottom in a manner to cause the lever to rock about its pivot and having the hook 123 at its forward end adapted to engage with a projecting ear on the depending lever 102 for the purpose of preventing the forward movement of the lever 102, and consequently holding the rock shaft 103 from turning. The spring 111 on the link 109 yields and allows the slide to move under pressure from the moving bottom until the bottom reaches its limit rearward, when its rear bar, as shown in dotted lines in Fig. 4, will raise the rear end of the lever 122 and disengage the hook from the ear and spring 111 will instantly rock the shaft 103 in its bearings to unclutch the operative mechanism, as before described.

When the hand lever is moved rearward and its detent is in the rear notch of the sector rack in position to return the bottom, it requires considerable force to disengage it without first releasing the detent from the notch, and to enable the automatic means for arresting the movement of the bottom to operate independent of the hand lever is the purpose of the yielding connection of the link 105 with the depending lever 102 by means of the spring yoke 106.

The various adjustments of lever 98 are shown diagrammatically in Figs. 23, 24 and 25, the dotted lines in Figs. 24 and 25 representing the position of the lever when the clutch mechanism is neutral, as shown in Fig. 20, and the distributing cylinder and movable bottom are at rest.

When the hand lever is moved forward to the position shown by full lines in Fig. 4, the large sprocket wheel on the rear axle is engaged with its driving member of the clutch mechanism and the distributing cylinder is given motion and communicates it to the ratchet feed mechanism for operating the flexible bottom which in this position is adjusted for a slow speed. To increase its speed the lever is moved further forward. When the lever is moved forward from the position shown in Figs. 4 and 23 it does not affect the operativeness of the clutch mechanism, the slots 62 allowing the stems 61 to move freely therein; the cam surfaces that actuate the clutch parts being provided with flat portions that allow the clutch members to remain at rest during a part of the rotation of the clutch shipping rings.

Figs. 23, 24 and 25 represent various adjustments of the feed mechanism as the hand lever is adjusted forward or rearward. In the full line position of the parts, as shown in Fig. 24, the hand lever is thrown to the limit of its rearward movement and the clutch mechanism is in the position shown in Fig. 19, and the sprocket wheel 53 is operative to return the movable bottom to its receiving position, and the distributing cylinder and feed mechanism remain inactive.

When the hand lever is adjusted in a forward direction, as shown by full lines in Fig. 23, the clutch mechanism is in the position shown in Fig. 7, the sprocket wheel 46 being operative to transmit motion to the distributing cylinder, and through it to the feed mechanism, which latter is almost inactive, caused by the link 115 holding the pawl carrying arm 85 against the force of the spring 88 and preventing a forward movement of its upper end, and consequently the pawls cannot clutch with the ratchet teeth at a distance from the axis of the eccentric 87 sufficient to make it effective to move the ratchet wheel but a little owing to the free movement of the part 90 along the part 89 of the pitman before contacting with the head formed thereon.

When the lever is adjusted forward from the last named position, as shown by dotted lines in Fig. 23, the rearward movement of the link 115 allows the arm 85 to vibrate about its axis in a manner to increase the distance between its upper end and the axis of the eccentric 87, and the effective pull of the pitman is operative to move the ratchet wheel through a distance proportionate with the distance through which the hand lever is moved forward.

The entire mechanism is under full control of the operator, and by means of a single hand lever having a movement in a fore and aft direction.

With the box filled with the fertilizer to be distributed and the hand lever 98 in the position shown by dotted lines in Fig. 4, the operative parts will remain at rest, as the clutch members on the axle are disengaged from the sprocket wheels 46 and 53, as shown in Fig. 20. When the hand lever is moved forward the connecting link 105, connected with the lever 102, causes the shaft 103 to rock in its bearings by means of the lever arm 104 secured thereto, and to which the link is connected. The rocking movement of the shaft causes a movement of the clutch shipping ring 57 in a direction to allow the main sprocket wheel 46 to engage with the clutch member 43, by means of the lever arm 112, secured to shaft 103, and the link connection 113. The parts are now in position to transmit motion to the distributing cylinder, and the distributing cylinder transmits motion to the pawl carrying arm 85, which becomes effective to advance the movable bottom toward the cylinder when adjusted by means of the link connection and lever arm 114, which adjustment is caused by a further forward movement of the hand lever until its detent is in position to engage with the forward series of notches in the sector 101. The notches are so arranged and the associated parts of the feed mechanism proportioned to give a step by step increase of speed, the increase being about one-eighth of an inch for each notch; that is, when the detent is in the rearmost notch, the feed rearward of the flexible bottom is about one-eighth of an inch for each revolution of the distributing cylinder, and it increases one-eighth of an inch for each notch the lever is moved forward. When the bottom has moved rearward until the load has been discharged, its movement is automatically arrested and the hand lever returned to its initial position as previously described.

To cause the flexible bottom to return to its initial position, the operator moves the hand lever rearward to the rearmost notch in the sector rack, and the link 105 transmits motion to rock the shaft 103 in its bearings until the clutch ring 57 is so adjusted as to allow sprocket wheel 53 to engage with the clutch member 52, and then, by means of the chain 117, motion is directly communicated from the axle to the shaft 26 to move it in a direction to return the flexible bottom to its initial position to receive a load.

What I claim as my invention and desire to secure by Letters Patent is:

1. In a fertilizer distributer, the combination of a body, a movable flexible bottom mounted in said body, having its ends disconnected, means for moving said bottom in either direction longitudinally, and a supporting track for said bottom below the body, said track having a return bend at its forward end.

2. In a fertilizer distributer, the combination of a body comprising side sills, a movable flexible bottom mounted on said side sills and having its ends disconnected, means for moving said bottom in either direction longitudinally, and a supporting track for said bottom below said side sills, said track having an upwardly curved portion at its forward end.

3. In a fertilizer distributer, the combination of a body comprising side sills, a movable flexible bottom mounted on said side sills and having its ends disconnected, means for moving said bottom in either direction longitudinally, and a supporting track for said bottom below said side sills, said track having a circular vertical section at its forward end.

4. In a fertilizer distributer, the combination of a body comprising side sills, a movable flexible bottom mounted on said side sills and having its ends disconnected, means for moving said bottom in either direction longitudinally, and a supporting track for said bottom below said side sills, said track having a circular vertical section and a horizontal return portion at its forward end.

5. In a fertilizer distributer, the combination of a body comprising side sills, a bottom having its ends disconnected comprising bars having their opposite ends connected with sprocket chains, castings secured to the rear ends of said side sills, a shaft journaled in said castings, sprocket wheels secured to said shaft and engaging with said chains in a manner to move them in either direction, annular rims forming part of said castings and partially surrounding said sprocket wheels, a supporting track for said bottom below said sills and forming a continuation of said annular rims.

6. In a fertilizer distributer, the combination of a body comprising side sills, depending axle supports secured to said side sills near their rear ends, a flexible bottom having its ends disconnected and comprising bars having their opposite ends connected with sprocket chains, castings secured to the rear ends of said side sills, a shaft journaled in said castings, sprockets wheels secured to said shaft and engaging with said chains in a manner to move them in either direction, annular rims forming part of said castings and partially surrounding said sprocket wheels, a supporting track for said bottom below said sills forming a continuation of said annular rims secured thereto and to the depending axle supports.

7. In a fertilizer distributer, the combination of a distributing cylinder, a comb bar mounted above said cylinder, and means for vibrating said bar longitudinally relative to the axis of said cylinder.

8. In a fertilizer distributer, the combination of a distributing cylinder, a comb bar mounted above said cylinder, and means connected with the cylinder for vibrating said bar longitudinally relative to the axis thereof.

9. In a fertilizer distributer, the combination of a distributing cylinder, a comb bar mounted above said cylinder, and means comprising a cam secured to said cylinder for vibrating said bar longitudinally relative to the axis of said cylinder.

10. In a fertilizer distributer, the combination of a body, a distributing cylinder having a central shaft journaled at the rear end thereof, means for driving said cylinder comprising a gear member secured to said shaft and having a laterally projecting hub, the end surface of which is at an angle to the axis thereof, an arm having one end embracing said shaft and held in operative contact with said end surface, a comb bar mounted above said cylinder upon swinging links, and having the opposite end of said arm connected therewith.

11. In a fertilizer distributer, the combination of a body, a distributing cylinder having a central shaft journaled at the rear end thereof, means for driving said cylinder comprising a spur gear secured to said shaft and having a laterally projecting hub eccentric to the axis and having its end surface at an angle therewith, a boss projecting from said hub concentric therewith and having its end surface parallel with the end surface of the hub, an arm having one end embracing said boss, a nut on the end of the shaft, a washer between the nut and arm operative to hold said arm in contact with the end surface of said hub, a comb bar mounted above said cylinder upon swinging links, and having the opposite end of said arm connected therewith.

12. In a fertilizer distributer, the combination of a movable bottom, a shaft connected to the movable bottom, a driving axle, a distributing cylinder, power transmitting means connected to said driving axle and said distributing cylinder, power transmitting means connected to said shaft and said distributing cylinder for moving said bottom rearwardly, power transmitting means connected directly to said driving axle and said shaft for moving said bottom forwardly, and means comprising a single hand lever for controlling the transmission of motion from either of said power transmitting means.

13. In a fertilizer distributer, the combination of a movable bottom, a shaft connected to the movable bottom, a driving axle, a distributing cylinder, power transmitting means connected to said driving axle and said distributing cylinder, power transmitting means connected to said shaft and said distributing cylinder for moving said bottom rearwardly, power transmitting means connected directly to said driving axle and said shaft for moving said bottom forwardly, and means comprising a single hand lever for setting either of the power transmitting means to transmit motion.

14. In a fertilizer distributer, the combination of a movable bottom, a shaft connected to the movable bottom and provided with a plurality of power transmitting wheels for revolving said shaft, a driving axle provided with a plurality of power transmitting wheels, a distributing cylinder, power transmitting means connected to said cylinder and one of said wheels upon said driving axle, power transmitting means connected to said cylinder and one of said wheels on said shaft for feeding said bottom rearwardly, power transmitting means connected to the other wheel upon said shaft and the other wheel upon said axle for feeding the bottom forwardly, a clutch mechanism operative between the clutch mechanism operative between the power transmitting wheels upon the driving axle and a single hand lever for operating said clutch mechanism.

15. In a fertilizer distributer, the combination of a movable bottom, a shaft connected to the movable bottom and provided with a plurality of power transmitting wheels for revolving said shaft, a driving axle provided with a plurality of power transmitting wheels, a distributing cylinder, power transmitting means connected to said cylinder and one of said wheels upon the driving axle, power transmitting means connected to said cylinder and one of said wheels on said shaft for feeding said bottom rearwardly, said means comprising a variable speed mechanism, power transmitting means connected to the other wheel upon said shaft and the other wheel upon said axle for feeding the bottom forwardly, a clutch mechanism operative between the power transmitting wheels upon the driving axle and a single hand lever for operating said clutch mechanism and said variable speed mechanism.

16. In a fertilizer distributer, the combination of a movable bottom, a shaft connected to the movable bottom and provided with a plurality of power transmitting wheels for revolving said shaft, a driving axle provided with a plurality of power transmitting wheels, a distributing cylinder, power transmitting means connected to said cylinder and one of said wheels upon said driving axle, power transmitting means connected to said cylinder and one of said wheels on said shaft for feeding said bottom rearwardly, power transmitting means connected to the other wheel upon said shaft and the other wheel upon said axle for feeding the bottom forwardly, a clutch mechanism operative between the power transmitting wheels on the driving axle, said clutch mechanism comprising two clutch shipping rings rotatably mounted between said power transmitting wheels and adapted to control the clutch mechanism and a single hand lever adapted to control the movement of said rings.

17. In a fertilizer distributer, the combination of a body comprising side sills, depending castings secured to said side sills, a driving axle journaled in said castings, clutch members secured to said axle upon opposite sides of one of said castings, power transmitting wheels loosely journaled on the axle adjacent said clutch members and adapted to engage with or be disengaged therefrom, clutch shipping rings rotatably mounted upon opposite sides of said depending casting and engaging with said power transmitting wheels, cam surfaces on said rings adapted to engage with opposing cam surfaces on opposite sides of said depending casting, a movable bottom supported by said side sills, a distributing cylinder, a shaft connected to the movable bottom having a plurality of power transmitting wheels secured thereto, power transmitting means connected to one of the wheels on the shaft and one of the wheels upon the axle, power transmitting means connected to the distributing cylinder and the other wheel upon the axle, power transmitting means connected to the distributing cylinder and the other wheel upon said shaft and a single hand lever connected to the clutch shipping rings and adapted to rotate them simultaneously.

18. In a fertilizer distributer, the combination of a movable bottom, a shaft connected to the movable bottom and provided with a plurality of power transmitting wheels for revolving said shaft, a driving axle provided with a plurality of power transmitting wheels, a distributing cylinder, power transmitting means connected to said cylinder and one of said wheels on the driving axle, power transmitting means connected to said cylinder and one of said wheels on the shaft for feeding said bottom rearwardly, said means comprising a variable speed mechanism, power transmitting mechanism connected to the other wheel upon said shaft and the other wheel on said axle for feeding the bottom forwardly, a clutch mechanism operative between the power transmitting wheels on the driving axle, a rock-shaft mounted below the movable bottom, connections between the rock-shaft and clutch mechanism, and between the variable speed mechanism and rock-shaft, a hand lever, and connections between said hand lever and said rock-shaft.

19. In a fertilizer distributer, the combination of a movable bottom, a driving axle, a power transmitting wheel on said axle, a distributing cylinder, power transmitting means connected to said cylinder and said wheel on the axle, a shaft connected to the movable bottom and provided with a ratchet wheel for revolving said shaft, a pawl carrying arm rotatably mounted on said shaft and having a plurality of spring pressed pawls mounted thereon and engaging with said ratchet wheel, a pitman connected to said pawl carrying arm and said cylinder in a manner to vibrate said arm, said pitman comprising two parts telescopically connected and a spring operative to elongate said pitman.

20. In a fertilizer distributer, the combination of a movable bottom, a driving axle, a power transmitting wheel on said axle, a distributing cylinder, power transmitting means connected to said cylinder and said wheel on the axle, a shaft connected to the movable bottom and provided with a ratchet wheel for revolving said shaft, a pawl carrying arm rotatably mounted on said shaft and having a plurality of spring pressed pawls mounted thereon and engaging with said ratchet wheel, a two-part pitman connected to said pawl carrying arm and said cylinder in a manner to vibrate said arm, said pitman being contractible and extensible longitudinally.

21. In a fertilizer distributer, the combination of a movable bottom, a driving axle, a power transmitting wheel on said axle, a distributing cylinder, power transmitting means connected to said cylinder and said wheel on the axle, a shaft connected to the movable bottom and provided with a ratchet wheel for revolving said shaft, a pawl carrying arm rotatably mounted on said shaft and having a plurality of spring pressed pawls mounted thereon and engaging with said ratchet wheel, a disk secured to said cylinder eccentric to the axis thereof, a yoke embracing said disk and provided with a sleeve portion, a rod having one end pivotally connected with the pawl carrying arm and its opposite end slidably connected with said sleeve in a manner to have a limited longitudinal movement therein, and a coiled spring surrounding said rod and operative to move said pawl carrying arm away from said cylinder.

22. In a fertilizer distributer, the combination of a movable bottom, a driving axle, a power transmitting wheel on said axle, a distributing cylinder, power transmitting means connected to said cylinder and said wheel, a shaft connected to the movable bottom and provided with a ratchet wheel for revolving said shaft, a pawl carrying arm rotatably mounted on said shaft and having a plurality of spring pressed pawls mounted thereon and engaging with said ratchet wheel, a disk secured to said cylinder eccentric to the axis thereof, a contractile and extensible pitman connecting said disk and said pawl carrying arm, and means for adjusting said arm in a manner to limit its movement relative to said ratchet wheel.

23. In a fertilizer distributer, the combination of distributing mechanism, means for advancing the fertilizer to said distributing mechanism comprising a movable bottom, a shaft connected therewith, fixed supports in which said shaft is journaled, a ratchet wheel secured to said shaft, a pawl arm having spring pressed pawls adapted to engage with said ratchet wheel to move it in one direction, a series of gravity pawls of unequal lengths pivotally mounted upon one of said fixed supports and adapted to engage with said ratchet wheel and prevent movement in an opposite direction, and a ring rotatably mounted on the pawl arm concentric with its axis having a laterally projecting ear portion engaging with said gravity pawl in a manner to disengage them when the ring is rotated in one direction, and means for rotating said ring.

24. In a fertilizer distributer, the combination of distributing mechanism, means for advancing the fertilizer to said distributing mechanism comprising a movable bottom, a shaft connected therewith, fixed supports in which said shaft is journaled, a ratchet wheel secured to said shaft, a pawl arm having spring pressed pawls adapted to engage with said ratchet wheel to move it in one direction, a pawl pivotally mounted on one of the fixed supports and adapted to lock the said wheel against movement in the same direction, a ring rotatably mounted on said pawl carrying arm concentric with its axis, having laterally projecting ears engaging with said pawls in a manner to disengage them when the ring is rotated in one direction, and means for rotating said ring.

25. In a fertilizer distributer, the combination of distributing mechanism, means for advancing the fertilizer to said distributing mechanism comprising a movable bottom, a shaft connected therewith, fixed supports in which said shaft is journaled, a ratchet wheel secured to said shaft, a pawl arm having pivotally mounted spring pressed pawls adapted to engage with said ratchet wheel to move it in one direction, a spring pressed pawl pivotally mounted on one of the fixed supports and adapted to lock the wheel against movement in the same direction, a pawl mechanism also pivotally mounted upon said fixed support and adapted to engage with said wheel and lock it against movement in an opposite direction, and means for alternately preventing engagement of said second spring pressed pawl and said pawl mechanism with said ratchet wheel.

26. In a fertilizer distributer, the combination of distributing mechanism, means for advancing the fertilizer to said distributing mechanism comprising a movable bottom, a shaft connected therewith, fixed supports in which said shaft is journaled, a ratchet wheel secured to said shaft, a pawl arm having pivotally mounted spring pressed pawls adapted to engage with said ratchet wheel to move it in one direction, a spring pressed pawl pivotally mounted on one of said fixed supports and adapted to lock the wheel against movement in the same direction, a pawl mechanism also pivotally mounted upon said fixed support and adapted to engage with said wheel and lock it against movement in an opposite direction, a ring rotatably mounted on said pawl arm having a laterally projecting ear portion adapted to engage with said second spring pressed pawl and said pawl mechanism alternately to prevent engagement thereof with said ratchet wheel, and means for rotating said ring.

27. In a fertilizer distributer, the combination of distributing mechanism, means for advancing the fertilizer to said distributing mechanism comprising a movable bottom, a shaft connected therewith, fixed supports in which said shaft is journaled, a ratchet wheel secured to said shaft, a pawl arm having pivotally mounted spring pressed pawls adapted to engage with said ratchet wheel to move it in one direction, a ring rotatably mounted on said pawl arm having laterally projecting ears adapted to engage with said pawls to prevent engagement thereof with said ratchet wheel, and means for rotating said ring.

28. In a fertilizer distributer, the combination of distributing mechanism, means for advancing the fertilizer to said distributing mechanism comprising a movable bottom, a shaft connected therewith, a ratchet wheel secured to said shaft, a pawl arm having pivotally mounted spring pressed pawls adapted to engage with said ratchet wheel to move it in one direction, a ring rotatably mounted on said pawl arm having laterally projecting ear portions engaging with said pawls in a manner to disengage them when rotated in one direction, a rock-shaft, an operative connection between said rock-shaft and said rotatable ring, and means connected with the movable bottom operative to rock said shaft when the bottom has reached a predetermined position.

29. In a fertilizer distributer, the combination of distributing mechanism, means for advancing the fertilizer to said distributing mechanism comprising a movable bottom, a shaft connected therewith, a ratchet wheel secured to said shaft, a pawl arm having pivotally mounted spring pressed pawls adapted to engage with said ratchet wheel to move it in one direction, a ring rotatably mounted on said pawl arm having laterally projecting ear portions engaging with said pawls in a manner to disengage them when rotated in one direction, a rock-shaft, an operative connection between said rock-shaft and said rotatable ring, and means comprising a longitudinally movable bar operatively connected with said rock-shaft, and a lug on the movable bottom adapted to contact with said bar when the bottom has reached a predetermined position to rock said shaft and disengage said pawls.

30. In a fertilizer distributer, the combination of distributing mechanism, means for advancing the fertilizer to said distributing mechanism comprising a movable bottom, a shaft connected therewith, a ratchet wheel secured to said shaft, a pawl arm having pivotally mounted spring pressed pawls adapted to engage with said ratchet wheel to move it in one direction, a ring rotatably mounted on said pawl arm having laterally projecting ear portions engaging with said pawls in a manner to disengage them when rotated in one direction, a rock-shaft, an operative connection between said rock-shaft and said rotatable ring, a lever secured to said rock-shaft, a longitudinally movable bar, a link connecting said bar with said lever on the rock-shaft, and a lug on the movable bottom adapted to contact with said bar when the bottom has reached a predetermined position to rock said shaft and disengage said pawls.

31. In a fertilizer distributer, the combination of distributing mechanism, means for advancing the fertilizer to said distributing mechanism comprising a movable bottom, a shaft connected therewith, a ratchet wheel secured to said shaft, a pawl arm having pivotally mounted spring pressed pawls carried thereby and adapted to engage with said ratchet wheel to move it in one direction, a ring rotatably mounted on said pawl arm having laterally projecting ear portions engaging with said pawls in a manner to disengage them when rotated in one direction, a rock-shaft, a lever secured to said rock-shaft, a link connecting said lever with said rotatable ring, a second lever secured to said rock-shaft, a longitudinally movable bar, a link yieldingly connecting said bar with said second lever, and a lug on the movable bottom adapted to contact with said bar when the bottom has reached a predetermined position to rock said shaft and disengage said pawls.

32. In a fertilizer distributer, the combination of a movable bottom, a distributing cylinder, a driving axle, a power transmitting wheel mounted on said axle, clutch mechanism between said wheel and said axle, and means for disengaging one from the other, power transmitting means connected to said wheel and said distributing cylinder, means for automatically operating said clutch disengaging means comprising a rock-shaft, a plurality of lever arms secured to the said rock-shaft, a link connection between one of said arms and said clutch disengaging means, a bar adapted to slide longitudinally, a link connection between said bar and the other lever on said rock-shaft, and a lug on said movable bottom adapted to contact with said bar in a manner to slide it longitudinally when said bottom reaches a predetermined position.

33. In a fertilizer distributer, the combination of a movable bottom, a distributing cylinder, a driving axle, a power transmitting wheel mounted on said axle, clutch mechanism between said wheel and said axle, and means for disengaging one from the other, power transmitting means connected to said wheel and said distributing cylinder, means for automatically operating said clutch disengaging means comprising a rock-shaft, a plurality of lever arms secured to said rock-shaft, a link connection between one of said arms and said clutch disengaging means, a bar adapted to slide longitudinally, a link connection adapted to yield in one direction between said bar and the other lever on said rock-shaft, and a lug on said movable bottom adapted to contact with said bar in a manner to slide it longitudinally when said bottom reaches a predetermined position.

34. In a fertilizer distributer, the combination of a movable bottom, a distributing cylinder, a driving axle, a power transmitting wheel mounted on said axle, clutch mechanism between said wheel and said axle, and means for disengaging one from the other, power transmitting means connected to said wheel and said cylinder, means for automatically operating said clutch disengaging means comprising a rock-shaft, a plurality of lever arms secured to said rock-shaft, a link connection between one of said arms and said clutch disengaging means, a bar adapted to slide longitudinally, a link pivotally connected with the other arm on said rock-shaft, and slidably connected with said bar, a coiled spring surrounding the link and operative to move the lever away from said bar, and a lug on said movable bottom adapted to contact with said bar in a manner to slide it longitudinally when said bottom reaches a predetermined position.

35. In a fertilizer distributer, the combination of a movable bottom, a shaft connected to the movable bottom and provided with a plurality of power transmitting wheels for revolving said shaft, a driving axle provided with a plurality of power transmitting wheels, a distributing cylinder, power transmitting means connected to said cylinder and one of said wheels upon said driving axle, power transmitting means connected to said cylinder and one of said wheels on said shaft for feeding said bottom rearwardly, power transmitting means connected to the other wheel upon said shaft and the other wheel upon said axle for feeding the bottom forwardly, a clutch mechanism operative between the power transmitting wheels upon the driving axle, and means for adjusting said clutch mechanism comprising a rock-shaft, a plurality of lever arms secured to said rock shaft, a link connection between one of said arms and said clutch adjusting means, a bar adapted to slide longitudinally, a link connection between said bar and the other lever on said rock-shaft, and a lug on said movable bottom adapted to contact with said bar in a manner to slide it longitudinally when said bottom reaches a predetermined position.

36. In a fertilizer distributer, the combination of a movable bottom, a distributing cylinder, means for moving said bottom rearward toward said cylinder, means for moving said bottom forward away from said cylinder, a clutch mechanism operative between said two sets of means comprising clutch adjusting mechanism, a rock-shaft, a plurality of lever arms secured to said rock-shaft, a link connection between said clutch adjusting mechanism and one of said lever arms, a longitudinally movable bar, a link connection between said bar and a second lever arm on said shaft, a lug upon said movable bottom adapted to contact with said bar when the bottom reaches a predetermined rearward position, a hand lever for adjusting said clutch adjusting mechanism, said hand lever being mounted at the forward end of the machine and provided with a spring pressed detent engaging with a sector rack, and a connection between said hand lever and a third lever arm on said rock-shaft, said connection adapted to yield in one direction.

37. In a fertilizer distributer, the combination of a movable bottom, a distributing cylinder, means for moving said bottom rearward toward said cylinder, a clutch mechanism forming part of said means, means for adjusting said clutch mechanism comprising a hand lever pivotally mounted on the machine, a single locking lever adapted to engage with and lock said hand lever against movement in one direction, said locking lever adapted to contact with the movable bottom at the limit of its rearward movement in a manner to release the hand lever.

38. In a fertilizer distributer, the combination of a movable bottom, a distributing cylinder, means for moving said bottom rearward toward said cylinder, a clutch mechanism forming part of said means, means for adjusting said clutch mechanism comprising a hand lever pivotally mounted on the machine, a single locking lever pivotally mounted on the machine and having one end adapted to engage directly with said hand lever in a manner to lock it against movement in one direction and its opposite end adapted to contact with the movable bottom at the limit of its rearward movement in a manner to release said hand lever.

39. In a fertilizer distributer, the combination of a movable bottom, a distributing cylinder, means for moving said bottom rearward toward said cylinder, a clutch mechanism forming part of said means, means for adjusting said clutch mechanism comprising a hand lever pivotally mounted on the machine, a lever pivotally mounted on the machine and having one end adapted to engage with said hand lever in a manner to lock it against movement in one direction and its opposite end having an upturned portion adapted to contact with the movable bottom at the limit of its rearward movement in a manner to release said hand lever.

40. In a fertilizer distributer, the combination of a movable bottom, a distributing cylinder, means for moving said bottom rearward toward said cylinder, a clutch mechanism forming part of said means, means for adjusting said clutch mechanism comprising a hand lever pivotally mounted, a locking lever pivotally mounted on a horizontal pivot upon the machine and having its forward end adapted to engage with said hand lever in a manner to lock it against movement in one direction and its opposite end having a rearwardly inclined upturned portion adapted to contact with the rear bar of the movable bottom, when it has reached a predetermined rearward limit, in a manner to release said locking lever from engagement with said hand lever.

41. In a fertilizer distributer, the combination of a movable bottom, a distributing cylinder, means for moving said bottom rearward toward said cylinder, a clutch mechanism forming part of said means, means for adjusting said clutch mechanism comprising a hand lever mounted upon a rock shaft suitably supported on the machine, a lever arm depending from said rock shaft, a projecting ear on said lever, a locking lever pivotally mounted on the machine and having at its forward end a hook adapted to engage with said projecting ear in a manner to lock the depending lever against movement in one direction and having at its opposite end a rearwardly and upwardly inclined portion adapted to contact with the rear bar of a movable bottom, when it has reached a predetermined rearward limit, in a manner to release said hook from engagement with said ear.

42. In a fertilizer distributer, the combination of a movable flexible bottom, power transmitting means, a shaft connected to the movable bottom and provided with a ratchet wheel designed to transmit motion thereto, a pawl carrying arm adapted to vibrate about the axis of said shaft and having a spring pressed pawl mounted thereon and engaging with said ratchet wheel, a pitman connected to said pawl carrying arm and said power transmitting means in a manner to vibrate said arm, said pitman comprising two parts adapted to slide longitudinally relative to each other in a manner to vary its operative length, and means operative to elongate said pitman.

43. In a fertilizer distributer, the combination of a movable flexible bottom, power transmitting means, a shaft connected to the movable bottom and provided with a ratchet wheel designed to transmit motion thereto, a pawl carrying arm adapted to vibrate about the axis of said shaft and having a series of spring pressed pawls mounted thereon and engaging with said ratchet wheel, a pitman connected to said pawl carrying arm and said power transmitting means in a manner to vibrate said arm, said pitman comprising two parts adapted to slide longitudinally relative to each other in a manner to vary its operative length, and a spring operative to elongate said pitman.

44. In a fertilizer distributer, the combination of a movable bottom, a driving axle, a shaft connected to the movable bottom, a distributing cylinder, power transmitting means connected to said cylinder and said axle comprising a clutch mechanism and power transmitting means connected to said cylinder and said shaft comprising a speed changing mechanism, and means comprising a single hand lever for controlling said power transmitting means and said speed changing mechanism.

45. In a fertilizer distributer, the combination of a movable bottom, a driving axle a shaft connected to the movable bottom, a distributing cylinder, power transmitting means connected to said driving axle and said cylinder and said shaft operative to move said bottom rearward, power transmitting means connected to said shaft and axle operative to move said bottom forward, a speed changing mechanism connected with said means for moving said bottom rearward, a clutch mechanism forming part of said power transmitting means, and means comprising a single hand lever for controlling the movement of said clutch mechanism and said speed changing mechanism.

46. In a fertilizer distributer, the combination of a movable bottom, a driving axle a shaft connected to the movable bottom, a distributing cylinder, power transmitting means connected to said driving axle and said cylinder and said shaft operative to move said bottom rearward, independent power transmitting means connected to said driving axle and said shaft and operative to move said bottom forward, a speed changing mechanism connected with said means for moving said bottom rearward, a clutch mechanism forming part of said power transmitting means, and means comprising a single hand lever for controlling said clutch and speed changing mechanism.

47. In a fertilizer distributer, the combination of a movable bottom, a shaft connected to the movable bottom and provided with a plurality of power transmitting wheels for revolving said shaft, a driving axle provided with a plurality of power transmitting wheels, a distributing cylinder, power transmitting means connected to said cylinder and one of said wheels upon said driving axle, power transmitting means connected to said cylinder and one of said wheels on said shaft for feeding said bottom rearwardly comprising a variable speed mechanism, power transmitting means connected to the other wheel upon said shaft and the other wheel upon said axle for feeding the bottom forwardly, a clutch mechanism operative between the power transmitting wheels on the driving axle, said clutch mechanism comprising two clutch shipping rings rotatably mounted between said power transmitting wheels and adapted to control the clutch mechanism, and a single hand lever adapted to control the movement of said rings and said variable speed mechanism.

48. In a fertilizer distributer, the combination of a body comprising side sills, depending castings secured to said side sills, a driving axle journaled in said castings, clutch members secured to said axle upon opposite sides of one of said castings, power transmitting wheels loosely journaled on the axle adjacent said clutch members and adapted to engage with or be disengaged therefrom, clutch shipping rings rotatably mounted upon opposite sides of said depending casting and engaging with said power transmitting wheels, cam surfaces on said rings adapted to engage with opposing cam surfaces on opposite sides of said depending casting, a movable bottom supported by said side sills, a distributing cylinder, a shaft connected to the movable bottom having a plurality of power transmitting wheels secured thereto, power transmitting means connected to one of the wheels on the shaft and one of the wheels upon the axle, power transmitting means connected to the distributing cylinder and the other wheel upon the axle, power transmitting means comprising a variable speed mechanism connected to the distributing cylinder and the other wheel upon said shaft, and a single hand lever controlling the movement of the clutch shipping rings and said variable speed mechanism.

49. In a fertilizer distributer, the combination of a movable bottom, a shaft connected to the movable bottom and provided with a plurality of power transmitting wheels for revolving said shaft, a driving axle provided with a plurality of power transmitting wheels, a distributing cylinder, power transmitting means connected to said cylinder and one of said wheels upon said driving axle, power transmitting means connected to said cylinder and one of said wheels on said shaft for feeding said bottom rearwardly, power transmitting means connected to the other wheel upon said shaft and the other wheel upon said axle for feeding the bottom forwardly, a clutch mechanism operative between the power transmitting wheels on the driving axle, said clutch mechanism comprising two clutch shipping rings rotatably mounted between said power transmitting wheels and adapted to control said clutch mechanism, a rock shaft mounted below the movable bottom, connections between the rock shaft and said clutch shipping rings, and a single hand lever connected to said rock shaft.

50. In a fertilizer distributer, the combination of distributing mechanism, means for advancing the fertilizer to said distributing mechanism comprising a movable bottom, a shaft connected therewith, a ratchet wheel secured to said shaft, a pawl arm having pivotally mounted spring pressed pawls adapted to engage with said ratchet wheel to move it in one direction, a ring rotatably mounted on said pawl arm, having laterally projecting ear portions engaging with said pawls in a manner to disengage them when rotated in one direction, a rock shaft, a connection between said rock shaft and said rotatable ring, a hand lever mounted upon the machine, and a connection between said hand lever and said rock shaft whereby the latter is rocked in its bearings by a movement of the former.

51. In a fertilizer distributer, the combination of a movable bottom, a driving axle, a power transmitting wheel on said axle, a distributing cylinder, power transmitting means connected to said cylinder and said wheel on the axle, a shaft connected to said movable bottom and provided with a ratchet wheel for revolving said shaft, a pawl arm adapted to vibrate about the axis of said shaft and having a plurality of spring pressed pawls mounted thereon and engaging with said ratchet wheel, a pitman connected to said pawl arm and said cylinder in a manner to vibrate said arm, said pitman having a variable operative length, and means for adjusting said pawl arm in a manner to limit its vibrating movement.

52. In a fertilizer distributer, the combination of a movable bottom, a shaft connected to said movable bottom, a ratchet wheel secured to said shaft and adapted to revolve it in one direction, a pawl arm adapted to vibrate about the axis of said shaft and having a plurality of spring pressed pawls mounted thereon and engaging with said ratchet wheel, means for vibrating said pawl arm comprising a pitman having a variable operative length, and means for adjusting said pawl arm about its axis in a manner to limit its vibrating movement.

53. In a fertilizer distributer, the combination of a movable bottom, a shaft connected to said movable bottom, a ratchet wheel secured to said shaft and adapted to revolve it in one direction, a pawl arm adapted to vibrate about the axis of said shaft and having a plurality of spring pressed pawls mounted thereon and engaging with said ratchet wheel, means for vibrating said pawl arm comprising a pitman having a variable operative length, and means for adjusting said pawl arm about its axis in a manner to limit its vibrating movement comprising a rock shaft and a connection between said rock shaft and said pawl arm.

54. In a fertilizer distributer, the combination of distributing mechanism, means for advancing the fertilizer to said distributing mechanism comprising a movable bottom, a shaft connected therewith, fixed supports in which said shaft is journaled, a ratchet wheel secured to said shaft, a pawl arm adapted to vibrate about the axis of said shaft and having spring pressed pawls mounted thereon and engaging with said ratchet wheel in a manner to move it in one direction, a series of pawls having unequal lengths mounted upon one of said fixed supports and adapted to engage with said ratchet wheel in a manner to prevent its moving in an opposite direction, a ring rotatably mounted on said pawl arm concentric with its axis, having a laterally projecting ear portion engaging with said series of pawls in a manner to disengage them when the ring is rotated in one direction, means for adjusting said pawl arm about its axis in a manner to limit its vibrating movement, comprising a rock shaft and connections between said rock shaft and said pawl arm and between said rock shaft and said rotatable ring.

55. In a fertilizer distributer, the combination of distributing mechanism, means for advancing the fertilizer to said distributing mechanism, comprising a movable bottom, a shaft connected therewith, fixed supports in which said shaft is journaled, a ratchet wheel secured to said shaft, a pawl arm having spring pressed pawls adapted to engage with said ratchet wheel to move it in one direction, a pawl pivotally mounted on one of said fixed supports and adapted to lock the said wheel against movement in the same direction, a ring rotatably mounted on said pawl arm concentric with the axis, having laterally projecting ears engaging with said pawls in a manner to disengage them when the ring is rotated in one direction, means for adjusting said pawl arm about its axis in a manner to limit its vibrating movement, comprising a rock shaft, connections between said rock shaft and said pawl arm and between said rock shaft and said rotatable ring.

56. In a fertilizer distributer, the combination of distributing mechanism, means for advancing the fertilizer to said distributing mechanism, comprising a movable bottom, a shaft connected therewith, fixed supports in which said shaft is journaled, a ratchet wheel secured to said shaft, a pawl arm mounted to vibrate about the axis of said shaft and having spring pressed pawls adapted to engage with said ratchet wheel in a manner to move it in one direction, a spring pressed pawl pivotally mounted on one of said fixed supports and adapted to lock said wheel against movement in the same direction, a pawl mechanism also pivotally mounted on said fixed support and adapted to engage said wheel in a manner to lock it against movement in an opposite direction, a ring rotatably mounted on said pawl arm, having a laterally projecting ear portion adapted to engage with said second spring pressed pawl and said pawl mechanism alternately to prevent engagement thereof with said ratchet wheel, means for adjusting said pawl arm about its axis in a manner to limit its vibrating movement, comprising a rock shaft, connections between said rock shaft and said pawl arm and between said rock shaft and said rotatable ring.

57. In a fertilizer distributer, the combination of distributing mechanism, means for advancing the material toward said distributing mechanism, comprising a movable bottom, means for moving said bottom toward said distributing mechanism, comprising a variable speed mechanism, independent means for moving said bottom away from said distributing mechanism, a clutch mechanism operative between said two means for moving said bottom, means for locking said movable bottom against movement in either direction, and a single hand lever operative to control the clutch mechanism, the speed changing mechanism and said locking means.

58. In a fertilizer distributer, the combination of a movable bottom, a shaft connected to the movable bottom a distributing cylinder, a driving axle, a power transmitting wheel mounted on said axle, a clutch mechanism between said wheel and said axle, and means for disengaging one from the other, power transmitting means connecting said wheel and said distributing cylinder and said cylinder and shaft comprising a variable speed mechanism, means for automatically operating said clutch disengaging means, comprising a bar adapted to slide longitudinally, connections between said bar and said clutch disengaging means and between said bar and said variable speed mechanism, said bar adapted to contact with said movable bottom in a manner to slide it longitudinally when said bottom has reached a predetermined limit.

59. In a fertilizer distributer, the combination of a distributing cylinder, a comb mounted above said cylinder, said comb comprising a tubular bar, comb teeth provided with forked arms loosely embracing said bar, clips secured to said bar between said arms, said clips engaging with opposing projections on said teeth in a manner to limit their downward movement, and means for yieldingly holding said clips in contact with said projections.

60. In a fertilizer distributer, the combination of a distributing cylinder, a comb mounted above said cylinder, said comb comprising a tubular bar, comb teeth provided with forked arms loosely embracing said bar, clips secured to said bar between said arms, said clips engaging with opposing projections on said teeth in a manner to limit their downward movement, and springs coiled about said bar and operative between said clips and said teeth to yieldingly press the latter in a downward direction.

61. In a manure spreader, the combination of a movable apron, a spreading cylinder, a hinged lever, and means actuated by said lever for varying the speed of the apron relative to the advance of the machine and for throwing the cylinder in and out of gear.

In witness whereof, I hereto affix my signature in presence of two witnesses.

WILLIAM ZACHOW.

Witnesses:
E. W. BURGESS, Jr.,
B. C. WAIT.